United States Patent [19]

Harrison, Jr.

[11] Patent Number: 4,703,769

[45] Date of Patent: Nov. 3, 1987

[54] UNIVERSAL CONNECTORS FOR JOINING STRINGERS

[75] Inventor: Ernest Harrison, Jr., Madison, Miss.

[73] Assignee: The United States of America as represented by the Administrator of the National Aeronautics and Space Administration, Washington, D.C.

[21] Appl. No.: 529,666

[22] Filed: Sep. 6, 1983

Related U.S. Application Data

[63] Continuation of Ser. No. 270,762, Jun. 5, 1981, abandoned.

[51] Int. Cl.$^4$ ............................................. A01H 3/00
[52] U.S. Cl. ............................... 135/67; 135/DIG. 9; 403/233
[58] Field of Search ............... 403/100, 169, 178, , 403/403, 405, 406, 205, 402, 233, 235; 272/70.3, 70.4, 85; 273/DIG. 7, DIG. 23; 135/65, 67, 69, 74, 75, 76, DIG. 9; 46/111, 115; 52/309.1, 309.3, 655, 656

[56] References Cited

U.S. PATENT DOCUMENTS

| | | | |
|---|---|---|---|
| 1,570,307 | 1/1926 | Kirby | 272/70.3 UX |
| 1,760,066 | 5/1930 | Jones | 403/233 X |
| 2,658,776 | 11/1953 | Wilcox | 46/29 |
| 2,862,544 | 12/1958 | Lilja | 272/70.3 |
| 3,030,124 | 4/1962 | Holloway | 403/169 |
| 3,315,994 | 4/1967 | Rifken | 403/169 |
| 3,442,276 | 5/1969 | Edwards et al. | 272/70.3 X |
| 3,902,732 | 9/1975 | Fosha, Jr. et al. | 273/DIG. 23 X |
| 4,160,607 | 7/1979 | Reichow | 403/100 X |
| 4,190,283 | 2/1980 | Boucher | 272/85 X |
| 4,298,016 | 11/1981 | Garelick | 135/74 X |
| 4,314,576 | 2/1982 | McGee | 135/67 |
| 4,526,348 | 7/1985 | Cammack | 403/233 X |

FOREIGN PATENT DOCUMENTS

| | | | |
|---|---|---|---|
| 1138037 | 1/1957 | France | 46/29 |
| 1278310 | 10/1961 | France | 46/29 |
| 919044 | 2/1963 | United Kingdom | 135/67 |

OTHER PUBLICATIONS

*Aluminum Walkers*, Winchester Walker Company, 1954.

Primary Examiner—James R. Feyrer
Attorney, Agent, or Firm—George F. Helfrich; John R. Manning

[57] ABSTRACT

This invention is a lightweight, universal connector that joins stringers at various angles. The connectors 10 are fabricated from fiber-epoxy resin strips that wrap around stringers 30 and have ends, tabs 16 and 18, which extend in one general direction. The inside surface of the first tab 16 lies on a plane defined by the stringers being joined, and the second tab 18 is separated from the first tab 16 by a distance equal to their thickness. Stringers 30 of different shapes and sizes are joined by alternately bonding the first tab 16 of one connector between the first 16 and second 18 tabs of another connector. Tee-joints are formed by using web elements 41 and 42 which each partially wrap around a stringer 3010 and have tabs 411 and 421 which are offset, and are bonded between tabs 16 and 18 of universal connectors 109 and 1010 bonded to another stringer 309. Sharp corners are trimmed from the tabs so that a gusset area remains between the stringers for support. Acute angle through obtuse angle joints are formed by trimming those edges of the tabs which lie against the stringers.

A specific application of the invention is a Walker 60, utilized by handicapped individuals, fabricated from composite materials that is 40% lighter than similar metallic structures.

3 Claims, 18 Drawing Figures

UNIVERSAL CONNECTORS FOR JOINING STRINGERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This application is a continuation of application Ser. No. 270,762, filed June 5, 1981, now abandoned.

BACKGROUND OF THE INVENTION

The invention relates to lightweight, interchangeable coupling devices used to join stringers at various angles on a common plane. The prior art teaches three basic concepts: contoured plates, U-shaped elements interconnected by pivots, and single piece molded units with slots. Contoured plates join stringers at common joints using two types of configurations. The first secures ends of stringers between two plates that are fastened together, and have preformed recesses. The second configuration uses band clamps to secure stringers to a single plate having preformed recesses. These plates do not allow interchanging of different size stringers, or use in applications which require different angles between the stringers; in addition, they are not conducive to fabrication from fiber-epoxy resin materials.

U-shaped elements secured to ends of stringers with their open ends interconnected by pivots are capable of holding stringers on a common plane, and being set at various angles. Rifken (U.S. Pat. No. 3,315,994) uses the U-shaped elements in conjunction with wedges attached to pivots that secure the stringers; such structures are not effective when the stringers are held at obtuse angles. The U-shaped elements are not desirable connector devices because wedges and pivots increase weight, and the U-shaped elements can only join stringers of similar diameters.

Single piece molded units with slots also exhibit undesirable characteristics because they only join stringers of predetermined shape at preset angles, and have excess material which increases weight.

Lightweight, universal coupling devices that join stringers of different shapes at various angles on a common plane are not taught by the prior art. In addition, existing coupling devices are not conducive to fabrication from unidirectional plies or warp/weft fabrics embedded in a resin, so special preparation of surfaces is necessary when joining stringers fabricated from lightweight, composite materials.

Accordingly, it is an object of this invention to provide a lightweight, universal connector which can be assembled at various angles to join stringers of different shapes on a common plane.

Another object of this invention is to provide gussets by joining the universal connectors with tabs extending therefrom.

Another object of this invention is to reduce weight and increase strength by alternately bonding the tabs, and trimming excess sharp corners.

Another object of the invention is to provide web elements to be used in conjunction with the universal connectors for forming tee-joints.

A prime object of this invention is to construct universial connectors of similar materials as fiber-resin stringers to eliminate problems with attaching the stringers to the connectors.

A further object of the invention is to construct structures 40% lighter than conventional steel and aluminum models by using unidirectional, composite materials embedded in a resin.

SUMMARY OF THE INVENTION

The foregoing and other objects of the invention are achieved by constructing universal connectors from elements consisting of fiber-epoxy resin strips that wrap around stringers with the ends, tabs, extending parallel to, and offset from the plane defined by the stringers being joined. The connector elements are bonded to fiber-epoxy resin stringers, and to other connector elements with an epoxy resin of the same family of the stringers. The tabs of one connector element are alternately bonded to, and trimmed with, tabs of other connector elements to function as gussets. Tee-joints are formed by two web elements that each partially surround the end of a stringer and have tabs extending in opposite directions which are bonded between the tabs of universal connector elements on another stringer. The invention is specifically applied to construction of a graphite-fiber-epoxy resin walker which is 40% lighter than conventional steel and aluminum structures.

DETAILED DESCRIPTION OF THE INVENTION

Figure 1:
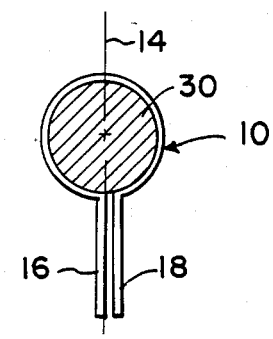
FIG. 1 is an end view of a universal connector element for cylindrical stringers showing tabs.

The invention is best understood by referring to the figures where the first two digits of a reference numeral relate to a particular aspect of the invention common to all figures.

Figure 2:
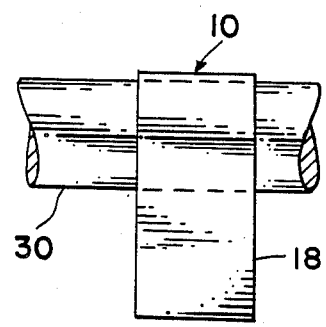
FIG. 2 is a side view of the universal connector element shown in FIG. 1.

FIGS. 1 and 2 are end and side views of the preferred embodiment of the present invention, and show a universal connector element 10 bonded to a stringer 30. Both the stringer 30 and connector element 10 are fabricated from unidirectional plies or warp/weft graphite fibers embedded in an epoxy resin; this allows diffusion bonding between their surfaces and eliminates problems associated with bonding dissimilar materials. Lightweight, composite materials may also be fabricated from fibers similar to fiberglass or kevlar in epoxy or polyester resins, and may exhibit the following parameters by varying fiber orientation:

| | | |
|---|---|---|
| Flexural strength | 1634 N/mm$^2$ | (23.69 lb/in$^2$) |
| Flexural modulus | 128 KN/mm$^2$ | (1856 lb/in$^2$) |
| Short beam shear | 77 N/mm$^2$ | (1.117 lb/in$^2$) |
| Tensile strength | 1524 N/mm$^2$ | (22.1 lb/in$^2$) |
| Tensile strength (Young's Modulus) | 136 KN/mm$^2$ | (1972 lb/in$^2$) |

The connector element 10 conforms to outside surfaces of the stringer 30, and provides a 0.127 mm (0.005 in) to 0.254 mm (0.010 in) clearance between their respective surfaces for bonding by an epoxy resin. Using a resin of the same family as that used in fabricating the composite material results in a diffusion bond. Diffusion bonds are the strongest type of bonds, and greatly enhance the invention's loading capacity. If the stringers are fabricated from metal, the connector elements should wrap tightly around the stringer, be fabricated from a similar metal, and be welded where diffusion bonds are designed.

Extending from the connector element 10 are a first and second tab 16 and 18. The first tab 16 is arranged so that the surface facing the second tab 18 lies on a plane 14 which passes through the centerline of the stringer 30. The second tab 18 is separated from the first tab by a distance equal to the first tab's thickness. The tabs 16 and 18 are arranged in this particular manner to form an interchangeable interface between connector elements that is more fully disclosed in FIGS. 3 and 4.

Figure 3:
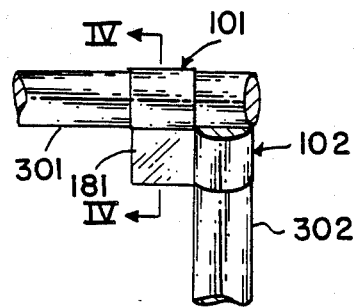
FIG. 3 is a side view of two cylindrical stringers joined by universal connector elements at a right angle.
Figure 4:
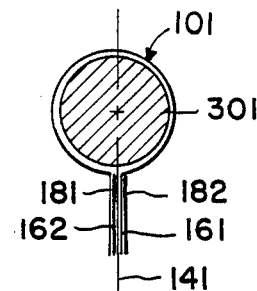
FIG. 4 is a sectional view of FIG. 3 along line IV—IV, and shows the arrangement of the tabs in greater detail.

FIGS. 3 and 4 show how connector elements 101 and 102 are arranged to form butted, right angle joints. More specifically, FIG. 3 is a side view of a connector element 101 bonded to a horizontal stringer 301, and oriented with its second tab 181 facing outward from the page. This connector element 101 is recessed from the end of the horizontal stringer by a distance equal to the outside diameter of a second connector element 102 bonded to the end of a vertical stringer 302. The second connector element 102 is oriented with its second tab 182 facing inward from the page. FIG. 4 is a sectional view of FIG. 3, and further indicates that the first tabs 161 and 162 of each connector element 101 and 102 are bonded between the first tabs 161 and 162 and second tabs 181 and 182 of the other connector element. Alternately bonding the tabs as shown in FIG. 4 positions the tabs, and centerlines of the stringers being joined, on a common plane 141 so that the shear forces within the connectors 101 and 102 are minimized, and total loading capacity of the connectors increased.

Figure 5:
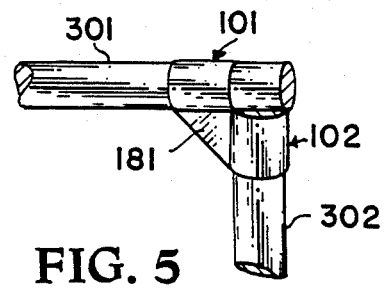
FIG. 5 is a side view of two cylindrical stringers joined by universal connector element which have been trimmed.

The tabs 161, 162, 181 and 182 may also be trimmed as in FIG. 5 to remove shape corners, and reduce weight without significantly affecting the loading capacity of the joint. Interchangeability of connector elements bonded to different shaped stringers is maintained by constructing the connector elements with tabs having a uniform thickness and configuration. This aspect of the invention allows for inventory reductions when there are several combinations of different shaped stringers being joined, or different angles at which they are assembled.

Figure 6:
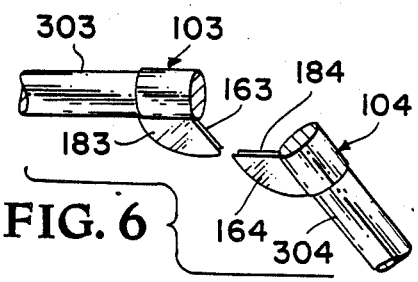
FIG. 6 is a side view of two cylindrical stringers showing how universal connector elements are prepared to form obtuse angles.

FIG. 6 is a side view of connector elements 103 and 104 having semicircular shaped tabs 163, 164, 183 and 184, for joining stringers 303 and 304 at obtuse angles. The connector elements 103 and 104 are bonded at the end of stringers 303 and 304, and have their tabs trimmed so that the arc angle is equal to the angle at which the stringers 303 and 304 are joined. The first 163 and 164 and second 183 and 184 tabs of the connector elements 103 and 104 are interpositioned in a similar manner as the first 161 and 162 and second 181 and 182 tabs in FIG. 4 to locate the centerline of the stringers on a common plane.

Figure 7:
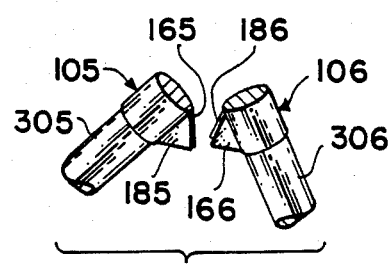
FIG. 7 is a side view of two cylindrical stringers showing how universal connector elements are prepared to form acute angles.

FIG. 7 is a side view of connector elements 105 and 106 bonded to stringers 305 and 306, that are assembled at an acute angle. The tabs 165, 166, 185 and 186, are trimmed so that the stringers 305 and 306 meet at their ends, and have sharp corners removed from edges away from the stringers. The first 165 and 166 and second 185 and 186 tabs are also interpositioned as in FIG. 4 to keep the stringers 305 and 306 on a common plane.

Figure 8:
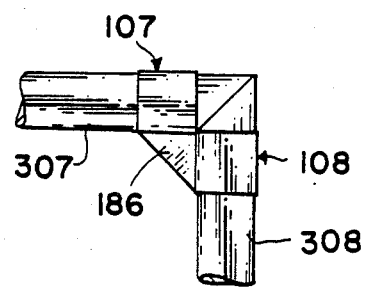
FIG. 8 is a side view of two cylindrical stringers joined by universal connectors where the stringers have a mitre joint.

FIG. 8 is a side view of a mitre joint with the connector elements 107 and 108 assembled in a similar manner as in FIGS. 3 and 5. Here the ends of the stringers differ in that they are tapered, and both extend through the connector elements until they meet. Mitre joints may be further strengthened by bonding the tapered ends to each other as well as to the connector elements. Again, the first 167 and 168, and second 187 and 188 tabs of each connector element are bonded in alternating layers as in FIG. 4 to position the two stringers 307 and 308 on the same plane.

Figure 9:
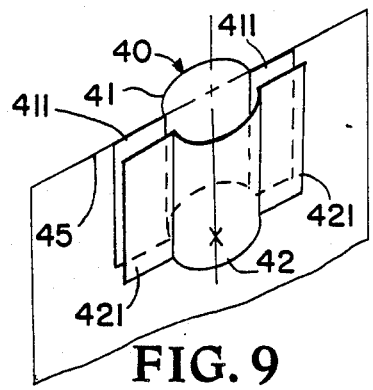
FIG. 9 is a perspective exploded view of web elements showing how they are arranged to form webs.

FIG. 9 is an exploded view of a web 40 used in conjunction with connector elements 109 and 1010 to form tee-joints as shown in FIGS. 10, 12, 13 and 14. The webs are fabricated from similar materials as the stringers and connector elements to allow diffusion bonding. Each web 40 has two elements 41 and 42 which are bonded together along the inner surfaces of tabs 411 and 421 that extend in opposite directions from a central portion of the web adapted to envelop a stringer. The tabs 411 and 421 are one-half the thickness of the connectors 109 and 1010, and are offset so that the outside surface of tabs 411 lie on a plane 45 which passes through a centerline of the stringers being joined.

Figure 10:
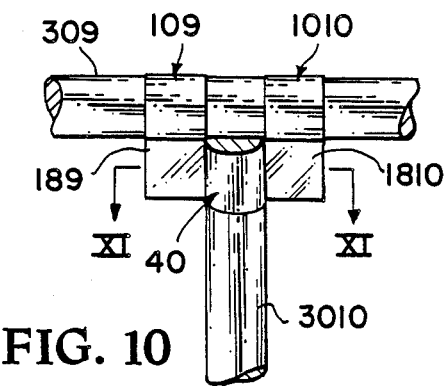
FIG. 10 is a side view of a right angle, tee-joint.
Figure 11:
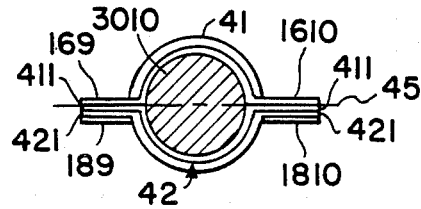
FIG. 11 is a sectional view of FIG. 10 along line XI—XI showing how web elements are arranged in conjunction with connector elements.

FIGS. 10 and 11 illustrate a right angle tee-joint where connector elements 109 and 1010 are bonded to a stringer 309 with their second tabs 189 and 1810 facing outward from the page. The web 40 is located between the connector elements 109 and 1010 with tabs 411 of the first web element 41 bonded to the first web tabs 411 of the connector elements 169 and 1610, and tabs 421 of the second web element 42 bonded to the second tabs of the connector elements 189 and 1810. A second web stringer 3010 is then bonded within the central portion of the web.

Figure 12:
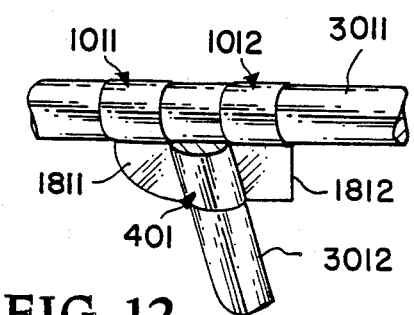
FIG. 12 is a side view of a tee-joint showing how the web is arranged for use with stringers positioned at other than right angle configurations.
Figure 13:
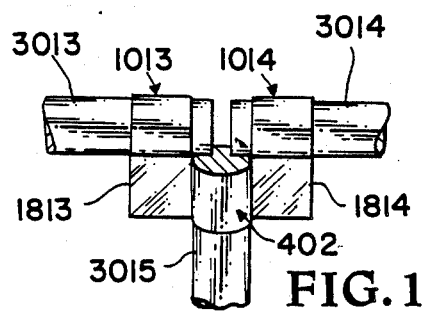
FIG. 13 is a side view of a right angle tee-joint showing how the web element and connectors may be used to joint three stringers on a common plane.
Figure 14:
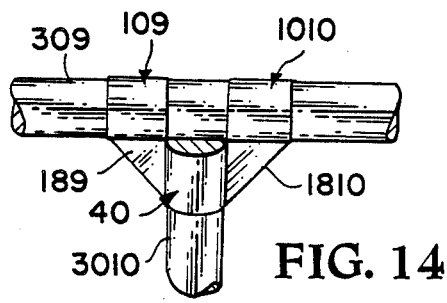
FIG. 14 is a side view of a tee-joint with trimmed tabs.

Tee-joints are formed at angles other than 90° by varying the contour of the central portion of a web as shown in FIG. 12, and trimming the tabs on connector elements 1011 and 1012. The connector elements 1011 and 1012 are arranged with the web 401 in a similar manner as in FIG. 11 so the stringers 3011 and 3012 remain on a common plane. Another variation of the tee-joint is shown in FIG. 13 where connector elements 1013 and 1014 are bonded to separate stringers 3013 and 3014, and to a web 402 which is bonded to a third stringer 3015. Though FIG. 13 indicates stringers 3013 and 3014 are co-linear, this is not necessary since the connector elements 1013 and 1014 may be bonded at various angles relative to the web 402. Finally, the first and second tabs of a connector element and the tabs on the first and second web element may be trimmed as in FIG. 14 to remove sharp corners, and reduce the structure's weight.

Figure 15:
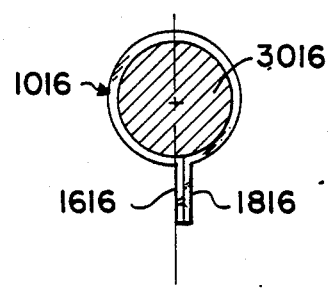
FIG. 15 is an end view of a connector element with tabs bonded together.
Figure 16:
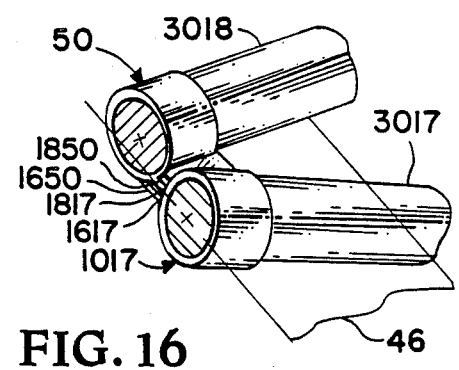
FIG. 16 is a view of a connector joining stringers not on a common plane.

Other tab configurations which may be alternately bonded with tabs of another connector element or web are shown in FIGS. 15 and 16. In FIG. 15 a connector element 1016 is boned to a stringer 3016 with the first and second tabs 1616 and 1816 of element 1016 bonded together. The outside surface of the first tab is positioned on a plane which passes through the stringer's centerline. Bonding the outside surface of the first tab 1616 against the outside surface of the first tab of a similar connector element, or tabs 411 of web 40 in FIG. 9, will result in a joint with all stringers on a common plane.

FIG. 16 illustrates how stringers 3017 and 3018 are assembled with their centerlines not on a common plane. One stringer 3017 is bonded to a universal connector element 1017 which has first and second tabs 1617 and 1817 arranged as in FIG. 1. A second stringer 3018 is bonded to a connector element 50 having a first and second tab 1650 and 1850 parallel to a plane 46 which does not pass through the centerline of stringer 3018. The tabs of each connector element are interpositioned so that the first tab of each connector 1617 and 1650 are bonded together, and between the second tabs 1817 and 1850; the resulting structure interpositions the tabs in a similar manner as the frst and second tabs 161, 162, 181 and 182, shown in FIG. 4.

When co-planer stringrs are joined there are tensile and compression forces within the tabs, but offsetting a stringer from the plane 46 will increase shear forces where the tabs extend from that portion of the connector element which wraps around the stringer. Assembling stringers 3017 and 3018 on different planes will therefore reduce the total load capacity of the connectors 1017 and 50.

Though the drawings illustrate universal connector elements joining cylindrical stringers, stringers of different cross-sectional shapes can also be joined by fabricating that portion of the connector element which wraps around the stringers to the same shape as the stringers being joined.

Figure 17:
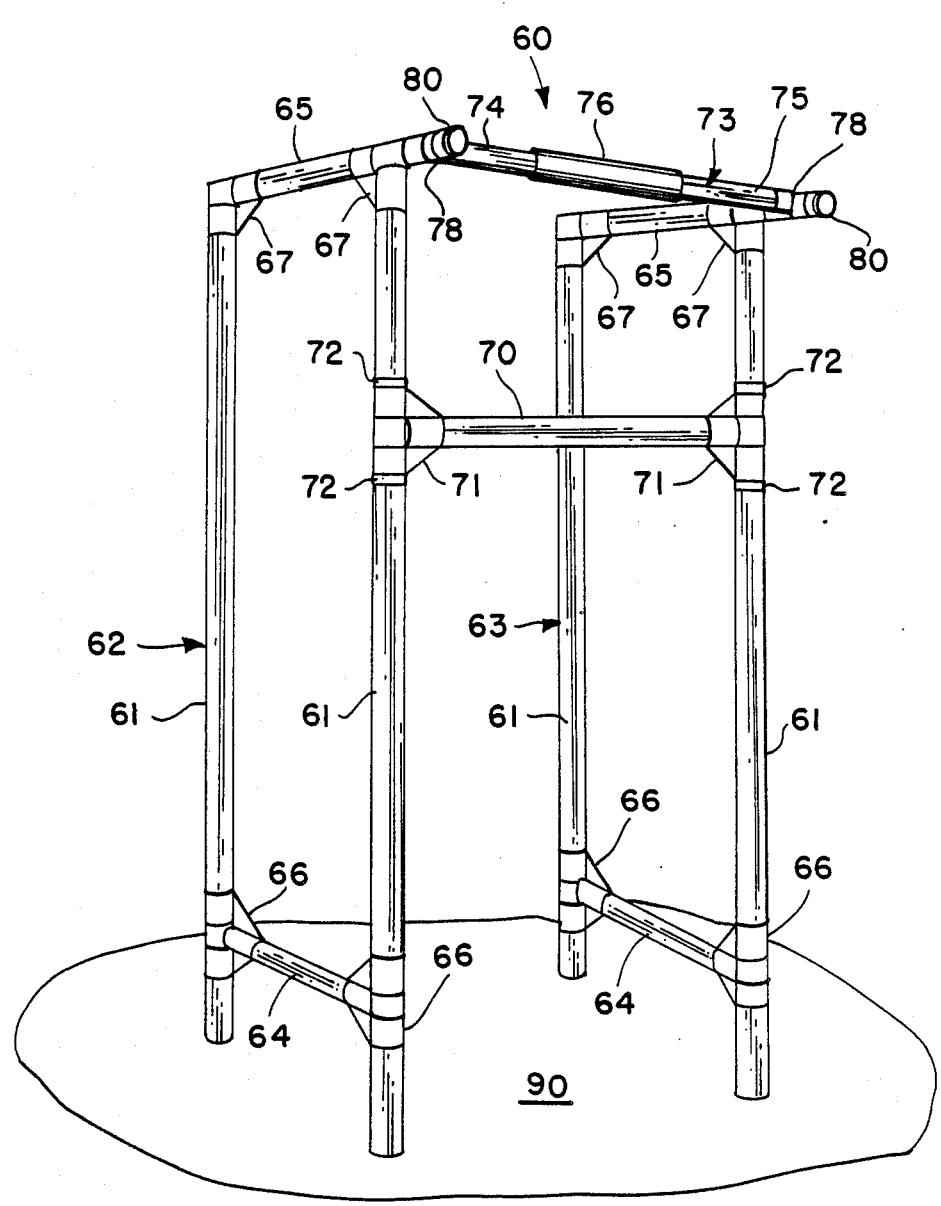
FIG. 17 is a view of a walker constructed of graphite-fiber-epoxy resin stringers and joints.

A particular application of the invention is a walker used as an aid to handicapped people constructed from composite materials to reduce weight. FIG. 17 illustrates a walker 60 constructed from graphite fiber-epoxy resin tubes having a 22.58 mm (0.889 in) o.d., and a 19 mm (0.748 in) i.d. Legs 61, 891.819 mm (35.111 in) long, form the vertical components of right and left side panels 62 and 63. Each side panel has a lower stringer 64, 412.039 mm (16.222 in) long, which is bonded to the legs 61 by tee-joints 66 at approximately 304.8 mm (12 in) from the ground 90, and constructed as disclosed in FIG. 14. The upper portion of each side panel 62 and 63 includes an upper horizontal stringer 65, 495.3 mm (19.5 in) long, which is secured to the legs 61 by butted, right angle joints 67 as disclosed in FIG. 5. The connectors used in constructing the tee and butted right angle joints 66 and 67 are 38.1 mm (1.5 in) wide and 2.54 mm (0.100 in) thick.

The side panels 62 and 63 are interconnected by lower and upper front stringers 70 and 73. The lower front stringer 70 is 4122.039 mm (16.222 in) long, and secured to the forward legs of the side panels 62 and 63 by modified tee-joints 71. Tee-joints 71 bonded to the lower front stringer 70 are constructed from connectors and webs twice as thick as used in tee-joints 66, and are not bonded to the legs 61. Retaining rings 72 hold the front lower stringer 70 457.2 mm (18 in) from the upper front stringer 73, but allow the legs 61 and side panels 62 and 63 to rotate within the joints 71. The upper front stringer 73 has a locking assembly wherein the right and left side panels 62 and 63 are positioned at 90° from the front stringers 70 when a sleeve 76 of the assembly is positioned over both the short 74 and long 75 portions of the upper front stringer 73.

Figure 18:
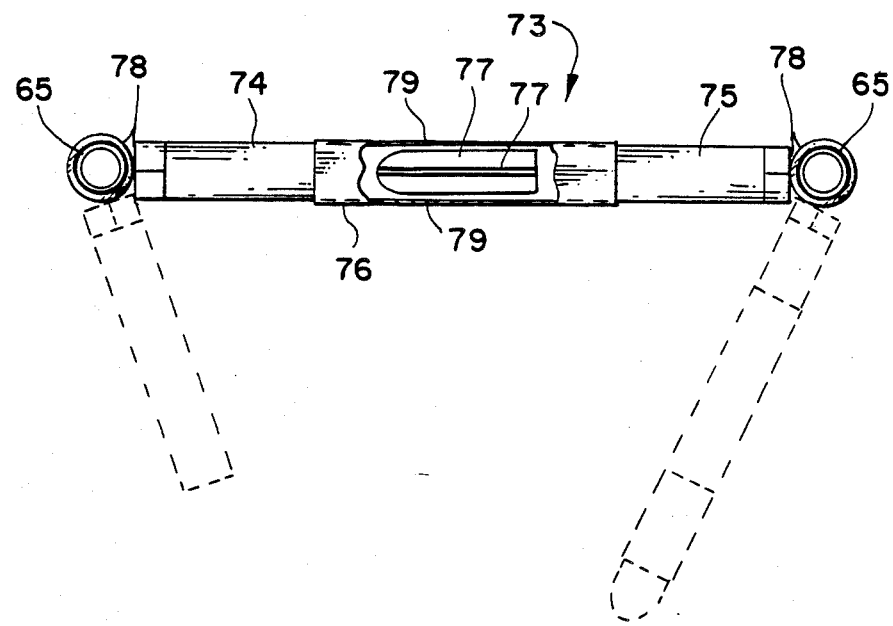
FIG. 18 is a more detailed view of the walker's upper front stringer.

FIG. 18 is a more detailed view of the upper front stringer 73 showing the assembly in both an interconnected and separated mode. Long and short portions 75 and 74 of the upper front stringer 73 are each bonded to butted, right angle joints 78 that envelope, but are not bonded to, the upper horizontal stringers 65. The long and short portions 75 and 74 are able to rotate about the upper horizontal stringers 65, and are constrained from sliding by retaining rings (FIG. 17) 80 which are bonded to the upper horizontal stringer 65. The walker 60 is collapsed by disconnecting upper front stringer portions 74 and 75, allowing them to rotate downward to the phantom position shown in FIG. 18, and rotating the side panels 62 and 63 inward.

The long and short portions 75 and 74 are temporarily held in a horizontal position for assembly by two 50.8 mm × 19.0 mm (2.0 × 0.748 in) interposed strips 77 that are bonded at right angles to each other within the long portion 75, and have a rounded end protruding outward. The rounded end is designed to protrude a sufficient distance such that it will fit into the hollow end of stringer short portion 74, but is not so long that it will prevent the stringer portions being aligned. Assembly is completed by sliding a sleeve 76 over region 79. The sleeve 76 is constructed from a graphite fiber-epoxy resin tube, 304.8 mm (12 in) long, 3.58 mm (0.141 in) thick, and fits tightly about the short and long portions of the upper front stringers 74 and 75.

The walker 60 weighs approximately 1.36 Kg (3lbs) and can support up to 272.16 Kg (600 lbs) on its right and left side panels 62 and 63. Similar walkers constructed from steel and aluminum weigh 2.7 to 3.6 Kg (6 to 8 lbs); thus a 40% reduction in weight is achieved. In addition to reducing weight, using fiber-epoxy resin connectors also reduces the cost of construction by eliminating problems associated with bonding dissimilar materials having different physical properties.

Although the invention has been described relative to a particular embodiment thereof, there are obviously numerous variations and modifications readily apparent to those skilled in the art in light of the above teachings.

It is therefore to be understood that the invention may be practiced other than as specifically described.

What is claimed as new and desired to be secured by Letters Patent of the United States is:

1. A light weight walker for aiding the handicapped, comprising:
    (a) a first panel for supporting loads on the walker consisting of legs and stringers connected rigidly at elbow joints and tee joints;
    (b) a second panel having the same elements as the first panel;
    (c) the elbow joints formed by universal connectors wrapped around and bonded to the legs and the stringers;
    (d) the universal connectors comprised of at least two connector elements each having a tubular section and a tab means extending outward from the tubular section to provide an interface on which the connector elements are bonded together;
    (e) the tee joints comprising a bonded combination of two web elements and two of the connector elements;
    (f) the web elements each enveloping and being bonded to one-half of the outer circumference of the end of the stringer or leg where the tee joint is formed and each said web element having a tab means extending outward on both sides of the leg or stringer;
    (g) an interconnecting means for holding the first panel in a fixed position relative to the second panel comprised of an interconnecting stringer and two half-stringers which allow the walker to be collapsed;
    (h) the interconnecting stringer being connected to a leg of the first panel at one end and a leg of the second panel at the opposite end by means of rotating tee joints which are of the same construction as said tee joints except that the connector elements of said rotating tee joints are not bonded to the legs of the first or second panel but encircle the respective leg;
    (i) the half-stringers each connected at one end to a stringer of the first panel and a stringer of the second panel, respectively by means of a joint, said joint being rotatable about a respective stringer such that the free ends of the half-stringers may rotate to a common point with the half-stringers in axial alignment;
    (j) a tight fitting sleeve being slidable on the half-stringers such that it may be located over the common point to provide rigidity to the walker.

2. A lightweight walker as in claim 1 wherein:
the half-stringers are rotatably connected against butted, right angle joints, and have connector elements that wrap around, but are not bonded to top stringers of said first and second panel.

3. A lightweight walker as in claim 1 wherein:
a positioning means holds the half-stringers whereby said tight fitting sleeve can be positioned over said common point;
said positioning means includes two interpositioned strips bonded within one of the half-stringers, and has a rounded portion extending outward therefrom; and
said rounded portion fits within the other of the half-stringers and holds both of the half-stringers in axial alignment.

* * * * *